US008887797B2

(12) United States Patent
Kim et al.

(10) Patent No.: US 8,887,797 B2
(45) Date of Patent: Nov. 18, 2014

(54) AIR-CONDITIONER FOR VEHICLE

(75) Inventors: Jin Ho Kim, Suwon-si (KR); Dong Won Yeon, Hwaseong-si (KR); In Uk Hwang, Asan-si (KR)

(73) Assignee: Kia Motors Corporation, Seoul (KR)

( * ) Notice: Subject to any disclaimer, the term of this patent is extended or adjusted under 35 U.S.C. 154(b) by 841 days.

(21) Appl. No.: 12/617,233

(22) Filed: Nov. 12, 2009

(65) Prior Publication Data
US 2011/0048673 A1 Mar. 3, 2011

(30) Foreign Application Priority Data
Aug. 25, 2009 (KR) .................. 10-2009-0078652

(51) Int. Cl.
 *B60H 1/00* (2006.01)
(52) U.S. Cl.
 CPC .......... *B60H 1/0005* (2013.01); *B60H 1/00028* (2013.01)
 USPC ......................................... 165/202; 165/204
(58) Field of Classification Search
 CPC ..................... B60H 1/00064; B60H 2001/002
 USPC ................................................. 165/202, 204
 See application file for complete search history.

(56) References Cited

U.S. PATENT DOCUMENTS

| 4,356,966 | A * | 11/1982 | Kado | 237/12.3 A |
| 6,427,771 | B1 * | 8/2002 | Kako et al. | 165/204 |
| 6,431,267 | B1 * | 8/2002 | Tanaka | 165/204 |
| 7,726,391 | B2 * | 6/2010 | Seo et al. | 165/202 |
| 2003/0192334 | A1 | 10/2003 | Kawauchi et al. | |
| 2004/0016537 | A1 * | 1/2004 | Nakamura et al. | 165/204 |
| 2006/0175050 | A1 * | 8/2006 | Kang et al. | 165/203 |
| 2007/0095517 | A1 * | 5/2007 | Schall | 165/204 |

FOREIGN PATENT DOCUMENTS

| CN | 101505983 A | 8/2009 |
| JP | 2004-243881 A | 9/2004 |
| JP | 2004-268712 A | 9/2004 |
| JP | 2008-87575 A | 4/2008 |
| KR | 10-2006-0030386 A | 4/2006 |
| KR | 10-2006-0094142 A | 8/2006 |
| KR | 10-2006-0132186 A | 12/2006 |

* cited by examiner

Primary Examiner — Alexandra Elve
Assistant Examiner — Henry Crenshaw
(74) Attorney, Agent, or Firm — Morgan, Lewis & Bockius LLP (57) ABSTRACT

An air-conditioner for a vehicle may include a casing including an internal space therein, wherein the internal space communicates with an upper outlet formed in a side of the casing, an evaporator and a heating member installed in the casing, a partition wall partitioning a portion of the internal space behind the heating member into an upper space and a lower space, wherein the upper space includes at least a floor duct inlet and the lower space receives the heating member therein to form an upward flowing path which guides air from the heating member toward the upper outlet, a floor duct coupled to the upper space to communicate the at least a floor duct inlet with the outside, and a floor door installed in the casing to selectively open the upper space and/or a flowing path fluid-connecting the evaporator and the heating member to the upper outlet.

12 Claims, 8 Drawing Sheets

AIR-CONDITIONER FOR VEHICLE

CROSS-REFERENCE TO RELATED APPLICATION

The present application claims priority to Korean Patent Application No. 10-2009-0078652, filed on Aug. 25, 2009, the entire contents of which is incorporated herein for all purposes by this reference.

BACKGROUND OF THE INVENTION

1. Field of the Invention

The present invention relates, in general, to air-conditioners for vehicles and, more particularly, to an air-conditioner for a vehicle, which has a front floor duct and a rear floor duct on the side portion of a thin casing.

2. Description of Related Art

Generally, a vehicle is equipped with an air-conditioner for controlling the temperature and humidity of the air in the interior thereof. The air-conditioner generates warm air from a heater in the winter season, thus keeping the interior of the vehicle warm, and generates cool air from an evaporator in the summer season, thus keeping the interior of the vehicle cool.

Figure 7A:
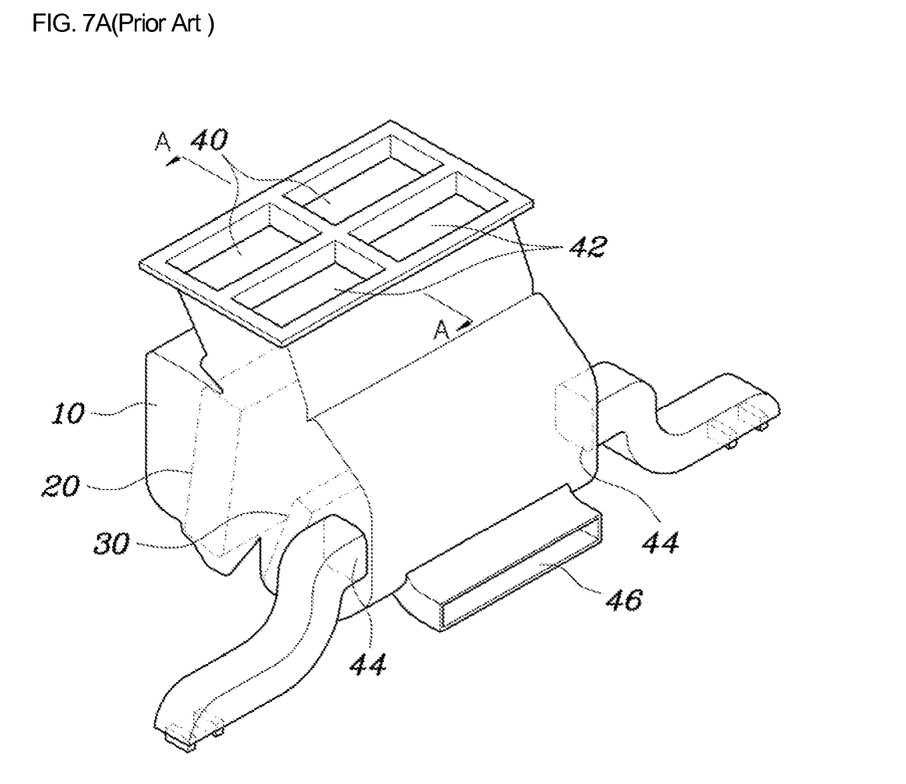
FIG. 7A is a perspective view illustrating a conventional air-conditioner for a vehicle.

As shown in FIG. 7A, a conventional air-conditioner for a vehicle comprises a casing 10, with both an evaporator 20 and a heater 30 installed in the casing 10. The evaporator 20 cools the air flowing in the interior of the casing 10, thus producing cool air, while the heater 30 heats the air flowing in the casing 10, thus producing warm air.

Further, the air-conditioner is provided with a defrost vent 40, a face vent 42, a shower vent 44, and a floor vent 46, which discharge air from the heater 30 or the evaporator 20 into the interior of the vehicle. Here, the defrost vent 40 discharges air from the heater 30 or the evaporator 20 to a windshield during DEF mode or mix mode. The face vent 42 discharges air from the heater 30 or the evaporator 20 towards the faces of a driver and a passenger when in vent mode or bi-level mode. The shower vent 44 and the floor vent 46 discharge air from the heater 30 or the evaporator 20 to the knees and legs of a driver and a passenger, or to the floor or rear seat in the vehicle during floor mode or bi-level mode.

Figure 7B:
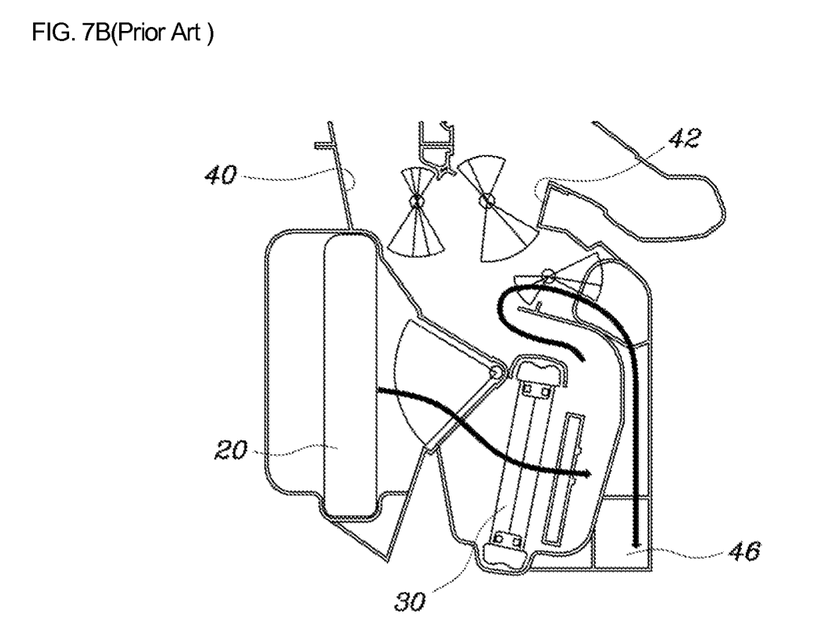
FIG. 7B is a sectional view taken along line "A-A" of FIG. 7A.

As shown in FIG. 7B, the conventional air-conditioner is problematic in that an additional space must be provided in the rear portion of the casing to discharge air to the floor vent 46, so that it is difficult to realize space intensive arrangement and design of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an air-conditioner for a vehicle, which realizes an air-conditioner of a thin thickness, thus improving the space utilization of the interior of a vehicle.

In an exemplary embodiment of the present invention, the air-conditioner for a vehicle may include a casing, an evaporator and a heater core installed, sequentially, in a front portion and a rear portion of the casing, a partition wall partitioning an internal space behind the heater core into an upper space and a lower space, a floor duct coupled to each of opposite sides of the upper space in such a way as to laterally communicate with the upper space, and a floor door installed in a side space of the partition wall to open or close the upper space.

The lower space may be an upward flowing path which guides air upwards from the heater core, and the floor duct may be a downward flowing path which guides air downwards from the upper space to the outside.

The floor duct may include a front floor duct and a rear floor duct which are integrated with each other.

A rear floor door may be provided in the upper space to open or close front and rear floor duct inlets in the upper space, and wherein the front floor duct communicates with the front floor duct inlet and the rear floor duct communicates with the rear floor duct inlet, wherein the floor door includes a dome type floor door, and wherein the rear floor door includes a flat type floor door.

In another aspect of the present invention, the air-conditioner for a vehicle may include a casing including an internal space therein, wherein the internal space communicates with an upper outlet formed in a side of the casing, an evaporator and a heating member installed in the casing, a partition wall partitioning a portion of the internal space behind the heating member into an upper space and a lower space, wherein the upper space includes at least a floor duct inlet and the lower space receives the heating member therein to form an upward flowing path which guides air from the heating member toward the upper outlet, a floor duct coupled to the upper space to communicate the at least a floor duct inlet with the outside, and a floor door installed in the casing to selectively open the upper space and/or a flowing path fluid-connecting the evaporator and the heating member to the upper outlet, wherein the floor door includes a dome type floor door.

The floor duct may form a downward flowing path which guides air downwards from the upper space to the outside of the casing.

The at least a floor duct inlet may include a front floor duct inlet and a rear floor duct inlet and the floor duct includes a front floor duct and a rear floor duct which are integrated with each other, and wherein the front floor duct communicates with the front floor duct inlet and the rear floor duct communicates with the rear floor duct inlet, wherein a rear floor door is provided in the upper space to selectively open the front floor duct inlet and the rear floor duct inlet, and wherein the rear floor door includes a flat type floor door.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to exemplary embodiments of the invention, examples of which are illustrated in the accompanying drawings.

Figure 1:
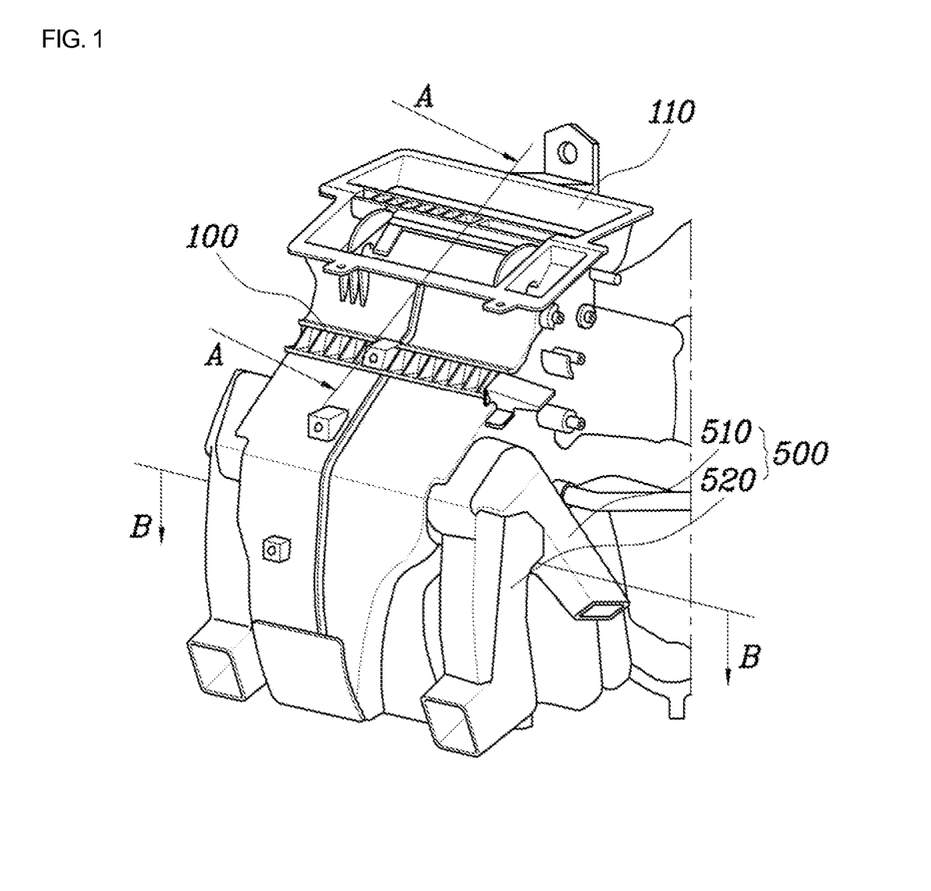
FIG. 1 is a perspective view illustrating an air-conditioner for a vehicle according to an exemplary embodiment of the present invention.
Figure 2:
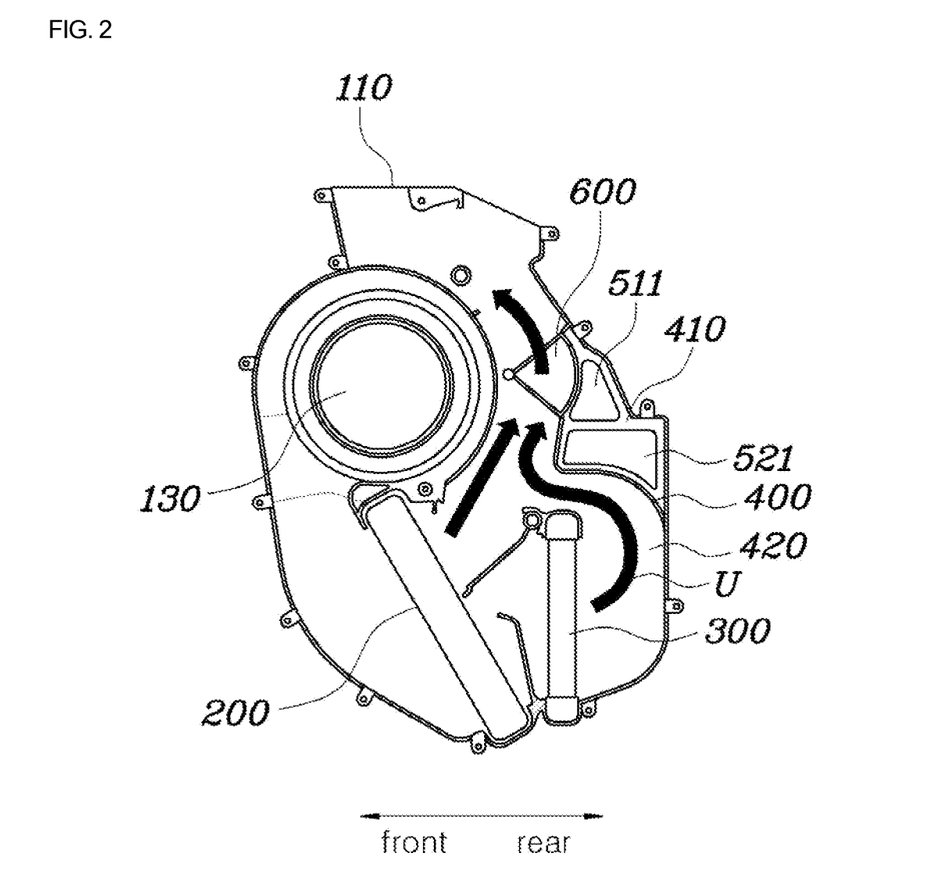
FIG. 2 is a sectional view taken along line "A-A" of FIG. 1 in an air-conditioner according to a first embodiment of the present invention.
Figure 3:
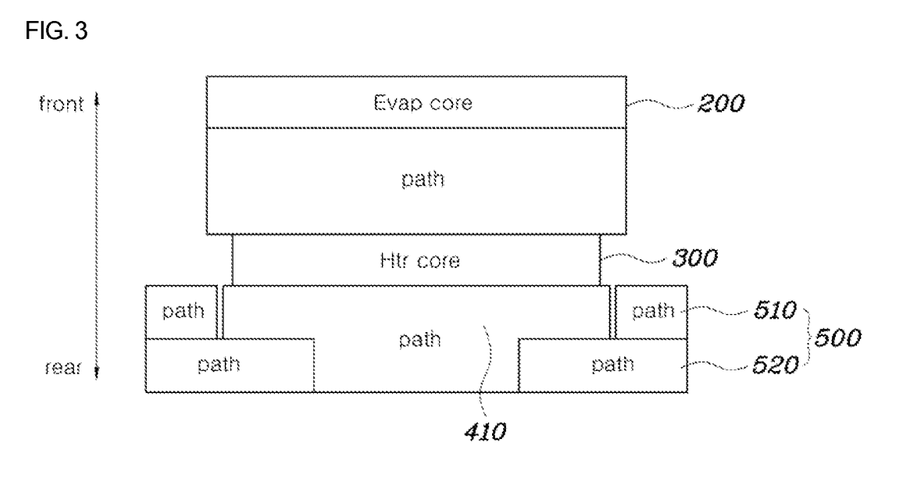
FIG. 3 is a sectional view taken along line "B-B" of FIG. 1 in the air-conditioner according to the first embodiment of the present invention.

As shown in FIGS. 1 to 3, an air-conditioner for a vehicle according to the first embodiment of the present invention is constructed so that the internal space of a casing 100 behind a heater core 300 is divided into an upper space 410 and a lower space 420, and a floor duct 500 is laterally coupled to the upper space 410, thus realizing the casing 100 of a thin thickness and allowing air-conditioned air to be supplied to the front and rear seats in the vehicle.

In detail, the casing 100 has a space in which air flows, and a blower and a door are installed in the space to control the flow of air.

An evaporator 200 and a heater core 300 are sequentially disposed in the front portion and the rear portion of the casing 100. The evaporator 200 cools air to generate cool air, and the heater core 300 heats air to generate warm air. Further, an upper outlet 110 is provided on the upper portion of the casing 100 to discharge air. The upper outlet 110 includes a defrost vent which discharges the air towards a windshield, and a face vent which discharges the air towards the faces of a driver and a passenger.

Particularly, a partition wall 400 is provided in the casing 100 to partition the internal space behind the heater core 300 into the upper space 410 and the lower space 420.

The partition wall 400 is installed to divide the internal space behind the heater core 300 into the upper and lower spaces, thus guiding air so that it flows upwards from the heater core 300 in the casing 100. That is, after air flows from the heater core to the lower space 420, the air may flow into the upper space 410 through the side space of the partition wall 400. Here, the lower space 420 serves as an upward flowing path U which guides the upward flow of air, whereas the floor duct 500 coupled to the upper space 410 serves as a downward flowing path which guides air to the floor in the vehicle.

The floor duct 500 is coupled to the upper space 410 of the casing 100 to communicate with the upper space 410. The floor duct 500 includes a front floor duct 510 which discharges air to the floor of the front seat, and a rear floor duct 520 which discharges air to the floor of the rear seat.

The front floor duct 510 and the rear floor duct 520 may be integrated into a single structure, or may be separately manufactured. Further, the front floor duct 510 is laterally coupled to each of opposite side portions of the upper space 410 through a front floor duct inlet 511, while the rear floor duct 520 is laterally coupled to each of opposite side portions of the upper space 410 through a rear floor duct inlet 521. Thus, air fed to the upper space 410 may flow through the front floor duct inlet 511 to the front floor duct 510, or may flow through a rear floor duct inlet 521 to the rear floor duct 520.

A floor door 600 is provided in the casing 100 to open or close the upper space 410. In an exemplary embodiment of the present invention, the floor door 600 comprises a dome (rotary) type door, and is installed to the inlet side of the upper space 410 to allow air to flow from the evaporator 200 or the heater core 300 to the upper space 410.

Figure 4:
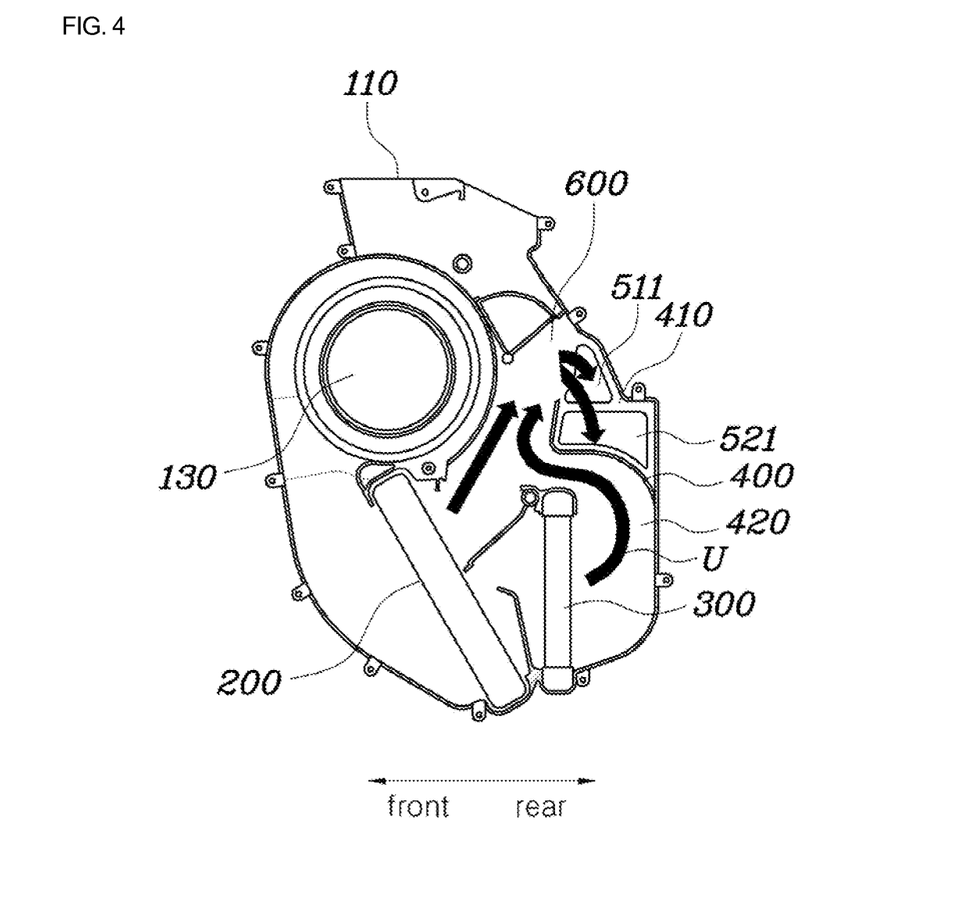
FIG. 4 is a view illustrating the state in which a floor door of FIG. 2 is rotated counterclockwise, according to the first embodiment of the present invention.

For example, as shown in FIG. 2, when the floor door 600 closes the inlet side of the upper space 410 and opens a path extending towards the upper outlet 110, air flows from the evaporator 200 or the heater core 300 to the upper outlet 110. Meanwhile, as shown in FIG. 4, when the floor door 600 opens the inlet side of the upper space 410 and closes the path extending towards the upper outlet 110, air flows from the evaporator 200 or the heater core 300 to the floor duct 500. Of course, when the floor door 600 opens both the inlet side of the upper space 410 and the path extending towards the upper outlet 110 (not shown), air may flow from the evaporator 200 or the heater core 300 to the upper outlet 110 and the upper space 410.

According to this embodiment, the dome (rotary) type floor door 600 has been described. However, the opening or closing direction of the floor door 600 may be variously changed according to the shape of the floor door.

Figure 5:
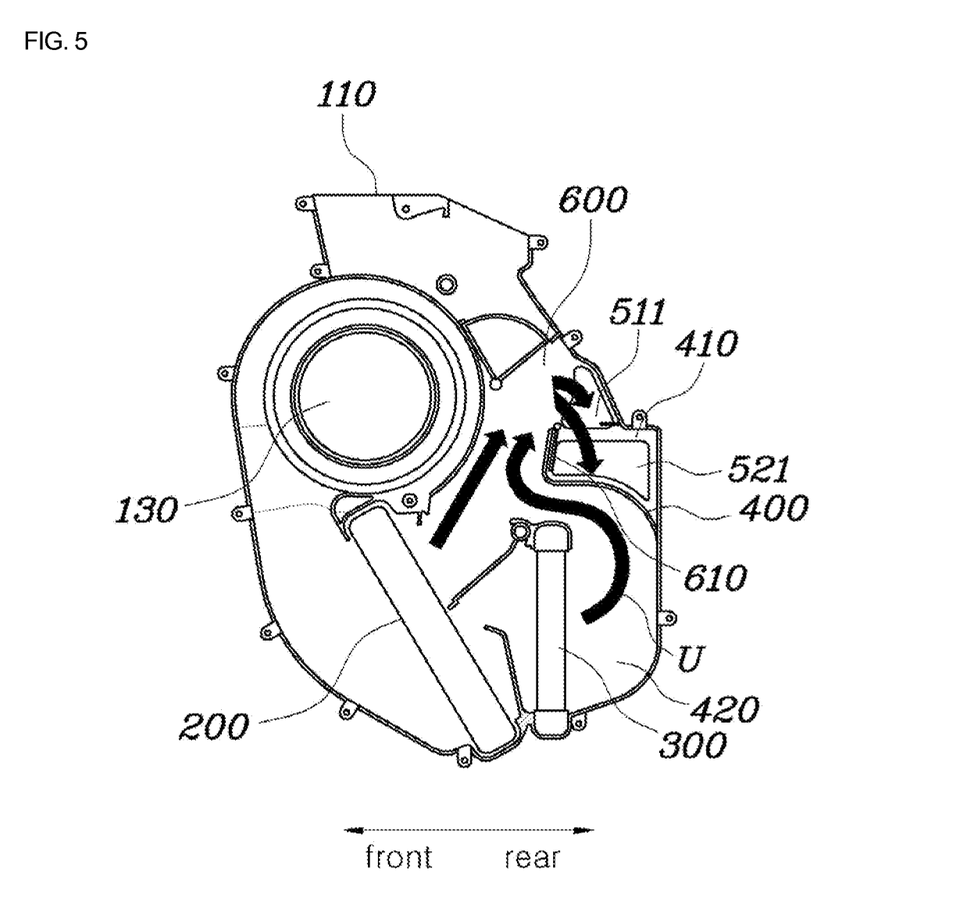
FIG. 5 is a sectional view taken along line "A-A" of FIG. 1 in an air-conditioner according to a second embodiment of the present invention.

As shown in FIG. 5, according to the second embodiment of the present invention, a rear floor door 610 may be provided in the upper space 410 to open or close the rear floor duct inlet 521. The rear floor door 610 has a flat type structure which is rotated between the front floor duct inlet 511 and the rear floor duct inlet 521, and controls the flow of air into the rear floor duct inlet 521.

That is, when the rear floor door 610 is rotated such that the front floor duct inlet 511 and the rear floor duct inlet 521 communicate with each other, air may flow from the upper space 410 through the front floor duct inlet 511 and the rear floor duct inlet 521 into the front floor duct 510 and the rear floor duct 520, respectively.

Figure 6:
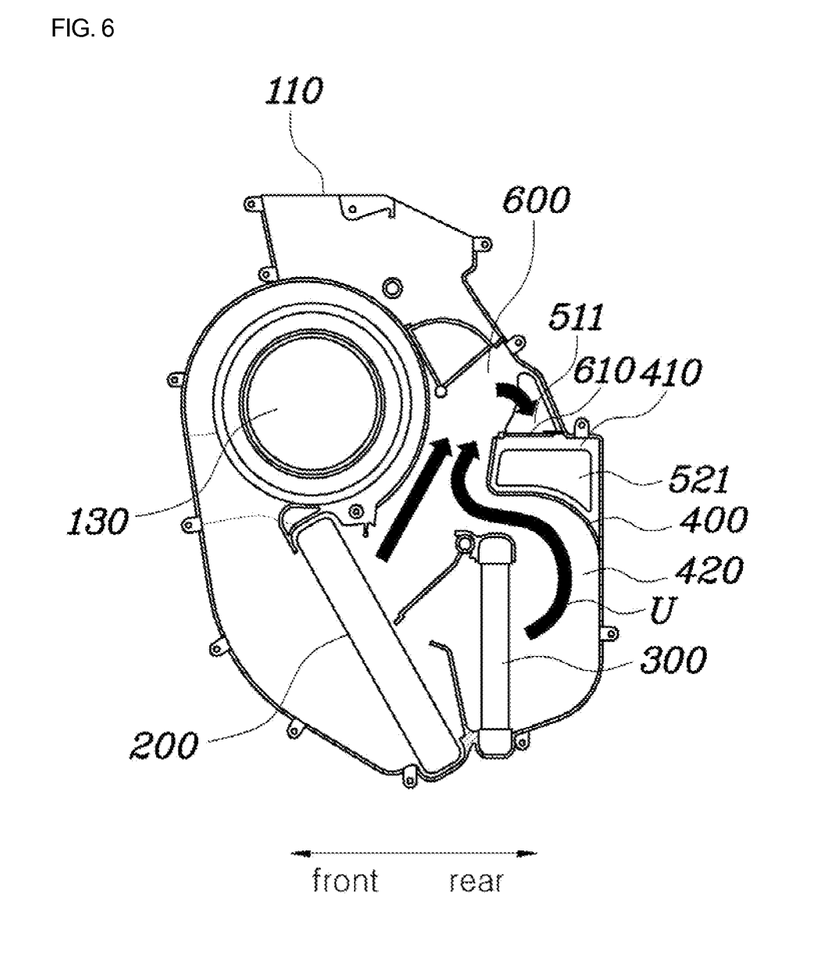
FIG. 6 is a view illustrating the state in which a rear floor door of FIG. 5 is rotated counterclockwise, according to the second embodiment of the present invention.

In contrast, as shown in FIG. 6, when the rear floor door 610 is rotated such that the front floor duct inlet 511 and the rear floor duct inlet 521 do not communicate with each other, air may flow from the upper space 410 through the front floor duct inlet 511 into the front floor duct 510, but may not flow from the upper space 410 through the rear floor duct inlet 521 into the rear floor duct 520.

As apparent from the above description, the air-conditioner according to various aspects of the present invention provides an advantage in that an air-conditioning operation is performed by controlling a front floor duct and a rear floor duct integrated with each other using a single floor door, thus allowing air to be efficiently discharged to a front seat and a rear seat in a vehicle.

Further, the air-conditioner according to the present invention provides an advantage in that the inlet of the rear floor duct is selectively opened or closed via a rear floor door, thus allowing air to be selectively discharged to the rear seat in the vehicle.

Particularly, the air-conditioner according to the present invention provides an advantage in that an additional space for discharging air to the floor duct is not formed in the rear portion of a casing, thus realizing a casing of a thin thickness, therefore enabling parts to be intensively arranged in the narrow interior of the vehicle.

For convenience in explanation and accurate definition in the appended claims, the terms "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air-conditioner for a vehicle, comprising:
   a casing including an upper outlet;
   an evaporator and a heater core installed, sequentially, in a front portion and a rear portion of the casing;
   a partition wall partitioning an internal space behind the heater core into an upper space and a lower space;
   a floor duct coupled to each of opposite sides of the upper space in such a way as to laterally communicate with the upper space, wherein the floor duct includes a front floor duct and a rear floor duct; and
   a floor door installed in a side space of the partition wall in a flow passage formed among the upper outlet, the upper space, and the lower space, wherein the floor door selectively opens a flowing path fluid-connecting the evaporator and the heating core to the upper space, or to the upper outlet, or to both of the upper space and the upper outlet, and wherein the floor door is in an inlet side of the upper space and in an inlet side of the upper outlet to allow air to flow from the evaporator and the heater core to the upper space or to the upper outlet; and
   a rear floor door provided between front and rear floor duct inlets in the upper space to open or close the rear floor duct inlet, and wherein the front floor duct communicates with the front floor duct inlet and the rear floor duct communicates with the rear floor duct inlet.

2. The air-conditioner as set forth in claim 1, wherein
   the lower space is an upward flowing path which guides air upwards from the heater core, and
   the floor duct is a downward flowing path which guides air downwards from the upper space to the outside of the casing.

3. The air-conditioner as set forth in claim 1, wherein the floor door includes a dome-shaped floor door.

4. The air-conditioner as set forth in claim 1, wherein the rear floor door includes a flat type floor door.

5. An air-conditioner for a vehicle, comprising:
   a casing including an internal space therein, wherein the internal space communicates with an upper outlet formed in the casing;
   an evaporator and a heating member installed in the casing;
   a partition wall partitioning a portion of the internal space behind the heating member into an upper space and a lower space, wherein the upper space includes at least a floor duct inlet and the lower space receives the heating member therein to form an upward flowing path which guides air from the heating member toward the upper outlet;
   a floor duct coupled to the upper space to communicate the at least a floor duct inlet with the outside of the casing; and
   a floor door installed in an inlet side of the upper space and in an inlet side of the upper outlet in the casing in a flow passage formed among the upper outlet, the upper space, and the lower space;
   wherein the floor door selectively opens a flowing path fluid-connecting the evaporator and the heating core to the upper space, or to the upper outlet, or to both of the upper space and the upper outlet.

6. The air-conditioner as set forth in claim 5, wherein the floor door includes a dome-shaped floor door.

7. The air-conditioner as set forth in claim 5, wherein the floor duct forms a downward flowing path which guides air downwards from the upper space to the outside of the casing.

8. The air-conditioner as set forth in claim 5, wherein the at least a floor duct inlet includes a front floor duct inlet and a rear floor duct inlet and the floor duct includes a front floor duct and a rear floor duct which are integrated with each other, and wherein the front floor duct communicates with the front floor duct inlet and the rear floor duct communicates with the rear floor duct inlet.

9. The air-conditioner as set forth in claim 8, wherein a rear floor door is provided in the upper space to selectively open the front floor duct inlet and the rear floor duct inlet.

10. The air-conditioner as set forth in claim 9, wherein the rear floor door includes a flat type floor door.

11. The air-conditioner as set forth in claim 1, wherein the upper outlet is provided on upper portion of the casing and includes a defrost vent and a face vent.

12. The air-conditioner as set forth in claim 5, wherein the upper outlet is provided on upper portion of the casing and includes a defrost vent and a face vent.

* * * * *